No. 754,682. PATENTED MAR. 15, 1904.
A. R. MUNDT.
BEET BLOCKING MACHINE.
APPLICATION FILED MAY 11, 1903.
NO MODEL. 3 SHEETS—SHEET 1.
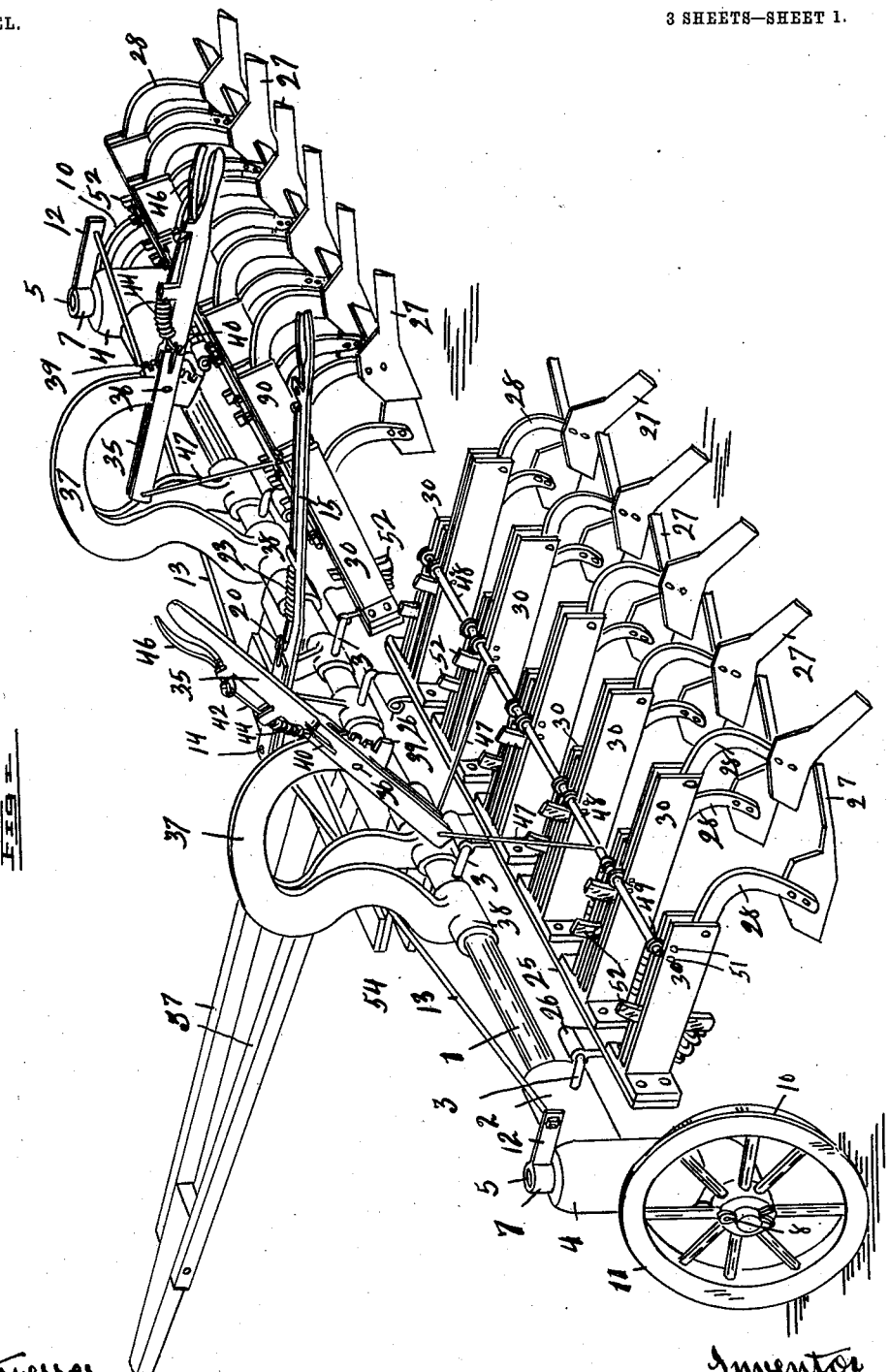

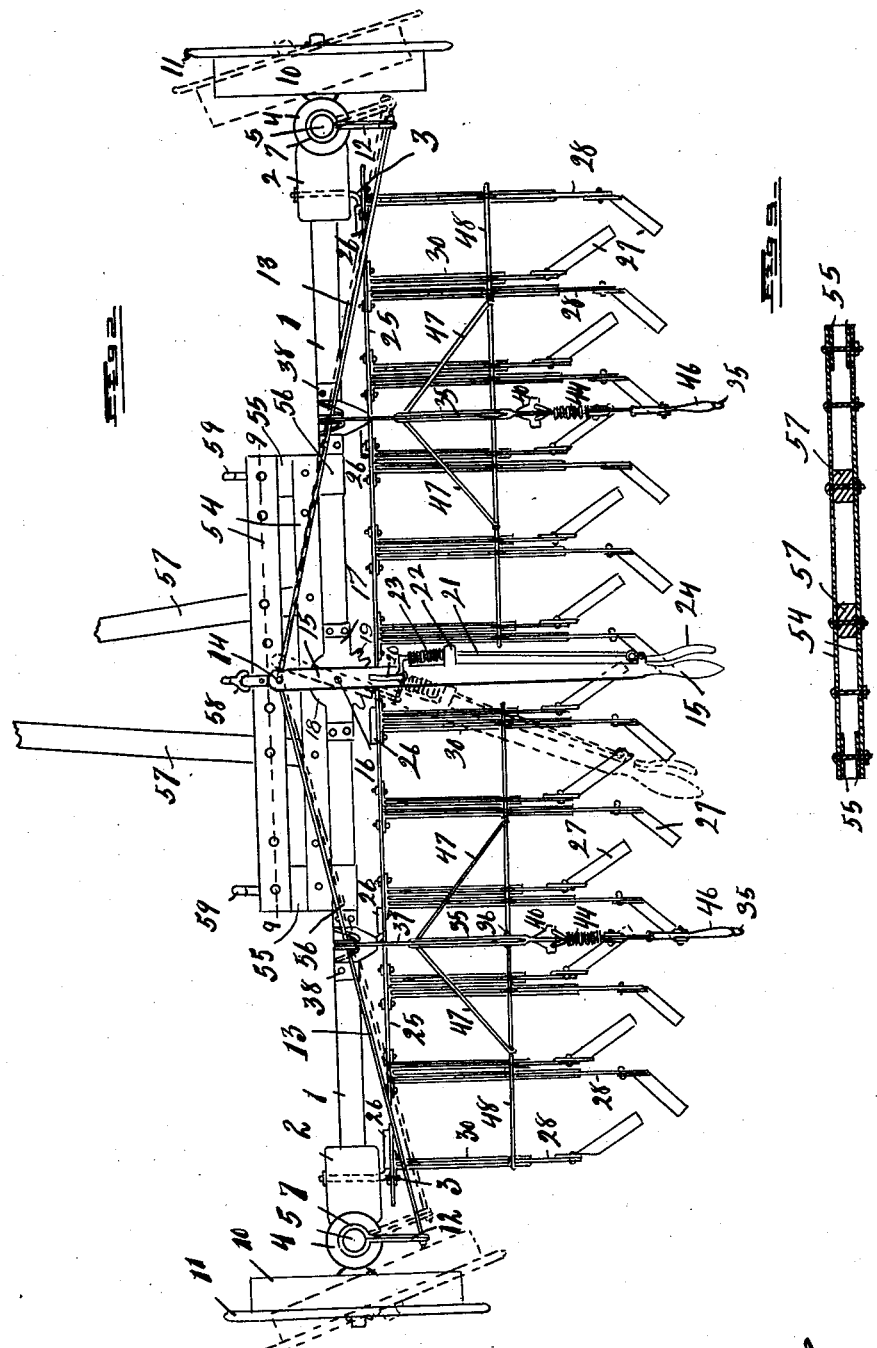

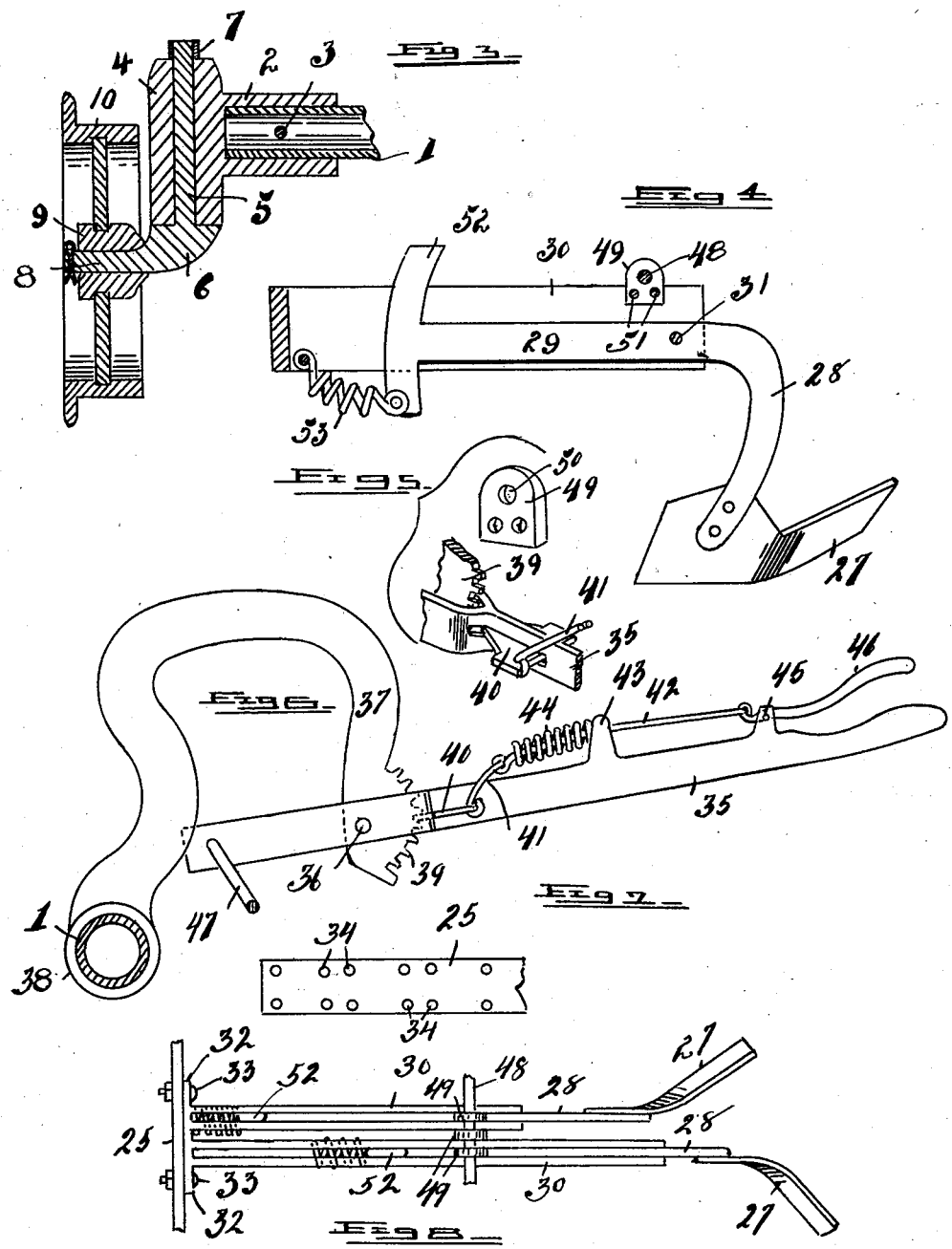

No. 754,682. Patented March 15, 1904.

UNITED STATES PATENT OFFICE.

ALBERT R. MUNDT, OF CHESTERFIELD TOWNSHIP, MACOMB COUNTY, MICHIGAN, ASSIGNOR OF ONE-HALF TO GEORGE W. TUCKER, OF CHESTERFIELD, MICHIGAN.

BEET-BLOCKING MACHINE.

SPECIFICATION forming part of Letters Patent No. 754,682, dated March 15, 1904.

Application filed May 11, 1903. Serial No. 156,597. (No model.)

*To all whom it may concern:*

Be it known that I, ALBERT R. MUNDT, a citizen of the United States, residing in the township of Chesterfield, in the county of Macomb, State of Michigan, have invented certain new and useful Improvements in Beet-Blocking Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a beet-blocking machine; and it consists in the construction and arrangement of parts hereinafter fully set forth, and pointed out particularly in the claims.

The object of the invention is to provide simple and efficient means for readily blocking the rows of beet-plants when said plants shall have attained the requisite growth, the machine being of comparatively simple and inexpensive construction and capable of ready manipulation, while the arrangement is such as to enable the machine to be guided by the driver to maintain it perfectly in line. A further arrangement serves to prevent the hoes from becoming clogged, while provision is made for raising the gangs or frame-sections containing the hoes and for preventing the parts from becoming broken should the hoes encounter an obstruction in the field.

The above object is attained by the mechanism illustrated in the accompanying drawings, in which—

Figure 1 is a perspective view of the machine involving this invention. Fig. 2 is a plan view thereof. Fig. 3 is a detail in section through one of the transporting-wheels and its journal, showing the manner of connecting the journal-supporting coupling to the axle. Fig. 4 is a longitudinal sectional view through one of the beams between the sides of which the standards of the hoes are pivoted. Fig. 5 is a perspective view of some of the operative parts, portions of which are broken away. Fig. 6 is an enlarged detail, partly in section, of one of the levers for raising one of the gangs of hoes, showing the standard to which the lever is fulcrumed and the circular rack carried thereby with which the locking-slide of the lever engages. Fig. 7 is an elevation of a portion of the transverse bar which is hinged to the axle and to which the beams carrying the hoes are adjustably secured. Fig. 8 is a plan view of one of the double beams secured to said bar, showing the standards to which the hoes are attached pivoted between the sides of said beam. Fig. 9 is a transverse section as on line 9 9 of Fig. 2.

Referring to the characters of reference, 1 designates the axle, formed, preferably, of tubing of the requisite gage and which extends transversely of the machine. At each end of said axle is a coupling 2, having a socket in the horizontal portion thereof, which receives the end of the axle and in which the axle is secured by the bolt 3, which passes through said parts. The vertical portion 4 of said coupling has an aperture therethrough which receives the stem 5 of the bracket 6, said stem being swiveled in the vertical portion of said coupling and receiving at its upper end the clamp-collar 7, which holds said stem in its bearing. Projecting laterally from the bracket 6 is the journal 8, which passes through the hub 9 of the transporting-wheel 10, whereby said wheel is mounted to rotate and to swing in the arc of the circle concentric with the axis of the stem 5. Upon the periphery of each of the transporting-wheels is a radial flange 11, adapted to enter the soil and prevent the machine from shifting.

Projecting from each of the clamp-collars 7, which embrace the upper ends of the stems 5, is an arm 12. Secured to the outer end of each of said arms is the rod 13. Said rods extend inwardly and have their inner ends pivoted at 14 to the forward end of the steering-lever 15, which is fulcrumed at 16 to a suitable stand 17, fast to the axle 1, and carrying at its top a circular plate 18, having a tooth-segment 19 concentric with the fulcrum of the lever 15. Mounted to slide in the lever is a locking-dog 20, adapted to engage the teeth of the circular rack to lock the lever 15 against movement. Secured to the lower end of said dog is a plunger-rod 21, which passes through a guide 22 on the lever 15 and has thereon a coiled spring 23, which is compressed between the lower ends of said rod and the guide 22 to normally hold the dog in engagement with the circular rack. Pivoted to the upper end of the plunger-rod 22 is the operative-handle 24, which is fulcrumed to the lever 15 and by means of which said plunger-rod may be retracted to carry the dog from engagement with the circular rack to allow a movement of the lever 15. By unlocking said lever and shifting it the rods 13 will be actuated to turn the stems 5 of the brackets carrying the transporting-wheels, and thereby swing said wheels so as to change the direction of the machine, as illustrated by dotted lines in Fig. 2. By means of this arrangement the machine may be kept in perfect alinement with the rows of beet-plants, although the horses may swerve from their course, making it possible for the operator to cause the machine to travel in a perfectly straight line across the field.

Extending transversely of the machine parallel with and slightly below the axle 1 is a bar 25. This bar is supported upon the axle by the hinge-bolts 3, which are provided with angle ends that enter the eyes 26, secured to the rear face of said bar. The bar 25 is divided at its longitudinal center, so that there are two separate sections thereof, each section of which is adapted to swing independently upon its hinges.

The cutting blades or hoes 27 are secured to outwardly and downwardly curved standards 28, as clearly shown in Fig. 4. These standards have a horizontal portion 29, which lies between the opposed sides of the beams 30 and are pivoted at 31 therebetween. The beams 30 are arranged in pairs and comprise horizontally-extending bars, between the sides of which the standards of the hoes are pivoted. The beams are of different lengths and are arranged so as to alternate in pairs. The beams of each pair are connected at the base, which is provided with the projecting ears 32, whereby the beams may be secured to the bar 25 by means of the bolts 33. The bar 25 is shown in Fig. 7 as provided with a double row of apertures 34 to receive the bolts 33, and said apertures are so arranged as to enable the beams to be adjusted laterally, so as to increase or decrease the space between the rows of beets blocked out by the machine. The hoes 27 are formed of steel blades provided with a sharp forward edge, as well as a cutting lower edge, and the ends of said hoes are bent or curved obliquely, so as to overlap and cause one to travel in the path of the other. The length of the beams 30 is such as to cause each alternate hoe to stand in advance of its companion hoe, thereby effecting a staggered arrangement and obviating the liability of tearing the ground and a possible loosening of the plant and also obviating the liability of clogging the hoes with weeds or other foreign accumulation which might lodge across them. It will be noted that the hoes cover every portion of the ground traversed by the machine except that portion which lies between the hoes mounted in each pair of beams. This space on a full-sized machine will be equal to two inches, more or less, and will be sufficient to leave standing between each pair of hoes as the machine is drawn along the plant it is desired to cultivate, while the hoes upon each side will cut out the remaining plant, as will be well understood.

To provide for raising the gangs of hoes when transporting the machine from place to place, so as to free them from contact with the ground, the levers 35 are employed. Each of these levers is pivoted or fulcrumed at 36 in the free end of the curved standard 37, which is divided at its base and said divided parts flared outwardly to serve as a lateral brace, the lower ends being securely clamped at 38 to the axle 1. The free end of each of the standards 37 lies in a slot in its corresponding lever 35 and is provided with a circular rack 39, adapted to be engaged by a sliding pawl or dog 40, mounted in each of said levers and connected by means of a bail 41 with a plunger 42, mounted on each of said levers and passing through a suitable guide 43 thereon. Each of said plunger-rods is provided with a coiled spring 44, which encircles the end thereof between the guide 43 and the free end of said rod, its tension being normally exerted to hold the dog 40 in engagement with the rack 39. Pivoted at 45 to each of said levers 35 is the handle 46, which suitably engages the plunger-rod 42 and by means of which said rod is actuated to withdraw the dog from engagement with the rack 39. Secured to the inner ends of each of the levers 35 are the connecting-rods 47, whose lower ends diverge and are pivotally connected to the cross-rod 48, lying across the beams 30, in which are secured the standards of the hoes. Said rod 48 is secured to said beams by means of the blocks 49, each of which is provided with an eye 50 therethrough and is secured by bolts 51 between the sides of said beams. The rod 40 passes through the eye 50 in said blocks, whereby the beams become united with or secured to said bar. It will now be apparent that by depressing either of the levers 35 the gang of hoes mounted in the beams connected by the rod 48 with said lever will be raised, as shown at the right of Fig. 1, so as to stand free from the ground. The bar 25, to which the beams are secured, swings upon the hinge-bolts 3 to accommodate said movement.

In order to allow the hoes to rise and pass over any encountered obstruction without causing all of the hoes in the gang to be carried upwardly from their work by said obstruction, the standard of each hoe, as before stated, is pivoted at 31 between the sides of the beams 30, whereby upon the encountering of an obstruction by the hoe it will be allowed to raise in order to pass said obstruction. To guide the standard in its movement and keep it always confined between the sides of the beam, the horizontal portion 29 thereof is provided with the projecting end 52, which is adapted to play between the sides of the beam and maintain the standard properly in place. For the purpose of returning the standard to its normal position after the hoe is raised to pass an obstruction a coiled spring 53 is employed, which is secured to the depending portion of the projecting end 52 and to the rear portion of the beam, as clearly shown in Fig. 4. This spring will yield as the hoe is raised to permit any necessary movement thereof and will serve to return the parts to their normal position after the obstruction has been passed without in any sense interfering with the work of any other hoe in the gang.

The draft-bars 54 are secured at their ends to suitable fittings 55, which are clamped at 56 rigidly to the axle. The bars 57 of the tongue are secured in any suitable manner to the draft-bars. These draft-bars, as will be seen, are double and are superimposed, the bars of the tongue fitting between them. Should it be desired to convert the tongue into a pair of thills for a single horse, the bars of the tongue may be separated and shifted to the outer ends of the draw-bars, so that a horse may work between them. Attached to the center of the draw-bar is a suitable clevice 58 for attachment of the whiffletree. If it is desired to pull directly from the draw-bars, they may be provided at their ends with suitable hooks 59, to which a swingletree may be coupled.

Having thus fully set forth my invention, what I claim as new, and desire to secure by Letters Patent, is—

1. In a beet-blocking machine, the combination of the fixed axle, a bracket swiveled at each end of said axle and carrying an outwardly-extending journal, transporting-wheels mounted on the journals of said brackets, rods connected with the swiveled stems of said brackets, a lever mounted on the axle between its ends to which the ends of said rods are coupled, said lever being pivoted to swing in the arc of a horizontal circle, a bar extending parallel with the axle and hinged thereto, rearwardly-extending divided beams mounted upon said bar to move longitudinally thereof, a series of hoes pivoted between the divided sides of said beams, said hoes being arranged in pairs to leave an open space between them for the blocking of the beet-plants, the ends of said hoes overlapping on each side of the space left for the plants substantially as set forth.

2. In a beet-blocking machine, the combination of the rigid axle, the transporting-wheels at the ends of said axle, the bar hinged in the rear of the axle, beams mounted in pairs to slide longitudinally on said bar, means for raising and lowering a series of said beams in unison, said hoes having standards pivoted between said beams, said standards having horizontal end portions which lie between the sides of said beams, a spring attached to the horizontal end of each standard for maintaining each hoe-beam normally in place, whereby each hoe may pass over an obstruction without effecting the other hoes in the gang.

3. In a beet-blocking machine, the combination of the fixed axle, the transporting-wheels at the ends of said axle, the bar parallel with the axle and hinged to the rear thereof, the hoe-carrying beams secured to said bar, to render them laterally adjustable, standards pivoted in pairs between the sides of said beams, a hoe secured to each of said standards, one hoe in each pair being in advance of the other, a guide upon each of the standards adapted to lie between the sides of said beams, and a spring attached to the standards to yieldingly retain the hoes in a working relation with the ground.

4. In a beet-blocking machine, the combination with the fixed axle, of the transporting-wheels at the ends of said axle, a bar secured to the axle and extending parallel therewith, the beams secured to said bar, the hoe-standards pivoted between said beams, means for normally preventing movement of said standards upon their pivots, hoes attached to said standards, said hoes being arranged in pairs, one in advance of the other and spaced to afford room for a beet-plant between them, the rear ends of said hoes extending rearwardly and curving laterally, so as to work the entire surface of the ground between the plants which are left by the hoes.

In testimony whereof I sign this specification in the presence of two witnesses.

ALBERT R. MUNDT.

Witnesses:
STUART H. SWITZER,
ELMER V. SUTTON.